Figure 1:
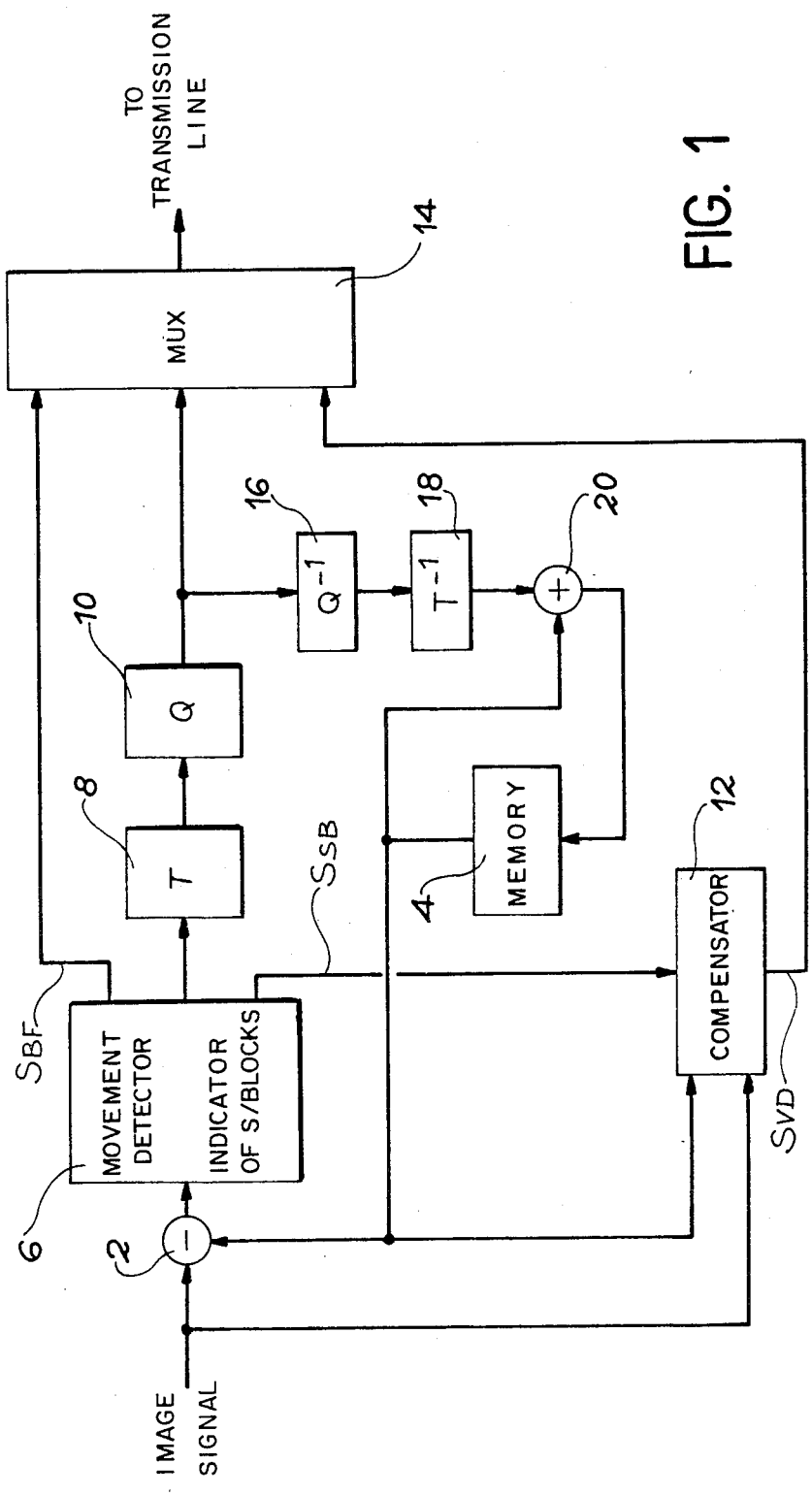

United States Patent [19]

Guichard et al.

[11] Patent Number: 4,796,087
[45] Date of Patent: Jan. 3, 1989

[54] PROCESS FOR CODING BY TRANSFORMATION FOR THE TRANSMISSION OF PICTURE SIGNALS

[76] Inventors: Jacques Guichard, 8 rue des Morillons, 75015 Paris; Gérard Eude, 26 Allée Jean-Bart, 77200 Torcy, both of France

[21] Appl. No.: 59,333

[22] Filed: Jun. 1, 1987

[30] Foreign Application Priority Data

May 29, 1986 [FR] France ................ 86 07713

[51] Int. Cl.⁴ .............................................. H04N 7/13
[52] U.S. Cl. .................................... 358/136; 358/105
[58] Field of Search ................................ 358/105, 136

[56] References Cited

U.S. PATENT DOCUMENTS

| | | | |
|---|---|---|---|
| 4,245,248 | 1/1981 | Netravali | 358/136 |
| 4,661,849 | 4/1987 | Hinman | 358/136 |
| 4,661,853 | 4/1987 | Roeder | 358/105 |
| 4,691,329 | 9/1987 | Juri | 358/136 |
| 4,695,882 | 9/1987 | Wada | 358/136 |

OTHER PUBLICATIONS

ICASSP '85 Proceedings (Mar. 1985), pp. 371-374.
Globecom '85 (Dec. 1985), pp. 689-693.
The Bell System Technical Journal (Sep. 1979), pp. 1703-1717.
IEEE Transactions On Communications (Dec. 1981), pp. 1799-1808.

*Primary Examiner*—Howard W. Britton
*Attorney, Agent, or Firm*—Nutter, McClennen & Fish

[57] ABSTRACT

A process for coding by transformation for the transmission of an image signal, comprises a stage of breaking down the image into blocks, each block containing a set of matrix-organized digital data and representing part of the picture, said process being characterized in that it comprises, for each block a step of detecting the movement of the block by comparing said block of the current image with the corresponding block of the preceding image, transmitting a non-refreshing code for the block and an identification code for the block in the image if the block is fixed, if a movement is detected in the block, breaking down the block into several subblocks, movement detection in each subblock by comparison with the corresponding subblock of the corresponding block of the preceding picture and transmission of a code which is a function of the movement of the subblock, if the block is moving.

8 Claims, 6 Drawing Sheets

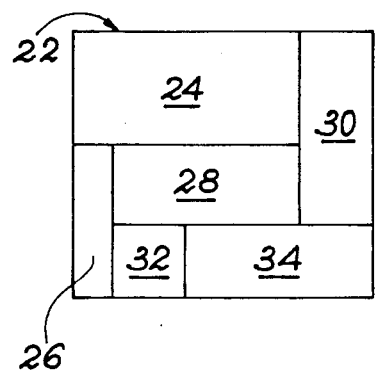
FIG. 2a
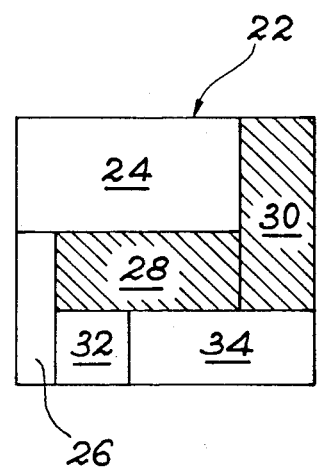
FIG. 2b
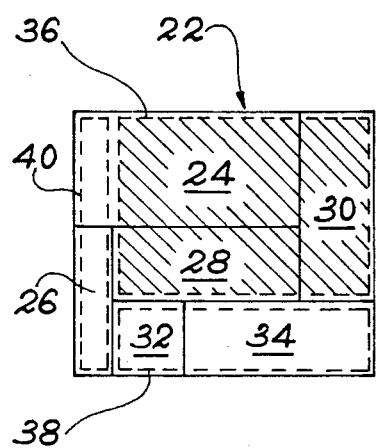
FIG. 2c
FIG. 2d
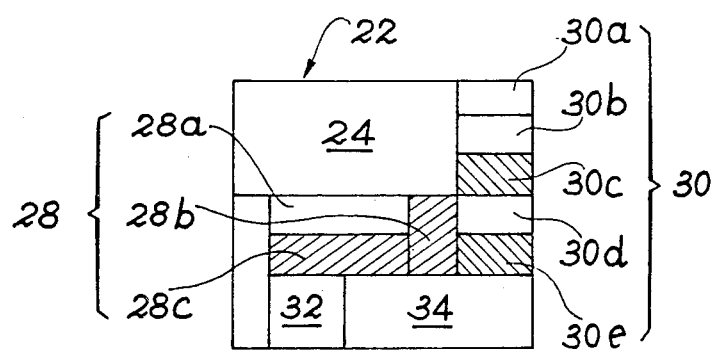

PROCESS FOR CODING BY TRANSFORMATION FOR THE TRANSMISSION OF PICTURE SIGNALS

The present invention relates to a process for coding by transformation for the transmission of picture signals. This invention relates to the real time processing of sequential information signals, such as video signals, with a view to compressing the necessary data volume for representing said picture, so as to permit the transmission thereof with a minimum bit rate on a transmission line. The process according to the invention more particularly applies to television, visiconferencing or visiophony. It can also be used to code pictures with slow variations, such as in remote monitoring.

Numerous picture coding systems are known for the purpose of compressing a picture signal, so as to be able to transmit said picture on a transmission line with a reduced bit rate. For example, reference can be made to EP-A No. 2-0084270, 2-0123456 and UP-Pat. No. 4,196,188, which describe different picture coding systems.

In these picture coding systems and in general terms in recent picture coding systems, maximum use is made of the time redundancy of the picture signal, i.e. for coding a picture, account is taken of the preceding picture.

A first type of known coding, called inter-picture coding, consists of comparing a picture to be coded with the preceding picture and transmitting, after coding, only the informations relative to the moving part of the picture. Another type of coding, called movement estimation coding, consists of anticipating the movement in the picture by estimating a picture in view of the preceding picture and to only transmit informations relative to the difference between said estimated picture and the effectively received picture.

In conventional manner, the picture coding system also comprises a transformation means for applying a transformation operator to said picture. This transformation operation translates the picture of the spatial or space range into a frequency range. The transformation operation can precede or follow inter-picture coding or by picture-applied movement estimation.

The transformation of a picture is off interest in that in the transformed space, the coefficients obtained are relatively well statistically decorrelated and in that the picture characteristics are contained in a smaller number of coefficients than in the untransformed picture. Thus, the transformation is advantageous, particularly because it makes it possible to reduce the number of coefficients associated with the picture and therefore the number of bits necessary for transmitting said picture on a transmission line. Moreover, in the transformed picture, it is possible to eliminate the low amplitude coefficients, or to roughly quantify them without significantly prejudicing the quality of the transmitted picture.

This elimination of the low amplitude coefficients corresponds to a non-linear spatial filtering effect, which is used as a masking technique for regulating the rate on the transmission line. Thus, when the movement becomes significant in a picture, the information quantity to be transmitted increases. However, the bit rate on the transmission line must remain constant, so that regulation takes place by reducing the magnitude of the coefficients corresponding to the detail of the picture. Thus, the picture or image appears slightly more blurred in the picture movement zone, but the eye hardly notices any difference due to said movement.

In practice, a picture is subdivided into a plurality of blocks before being processed, either by the movement estimation or inter-picture coding means, or by the transformation operator. This makes it easier to discern the parts of the picture modified between two successive pictures and therefore to reduce the rate on the transmission line, because only these modified parts are coded and transmitted. In the case of coding by movement estimation, this transmission makes it possible, for each moving block, to emit a displacement vector indicating the displacement of the block between the preceding picture and the current picture.

It is clear that the smaller the blocks the better the movements of the different picture parts are followed, but the number of displacement vectors to be transmitted is then greater. Conversely, the larger a block and the smaller the displacement vector number to be transmitted, the greater the probability of two objects moving independently are located within the same block. This decreases the efficiency of the prediction of the displacement vector.

Another reason why a picture is subdivided into blocks is associated with the function of the actual transform, although it is now possible to envisage the application of a single transformation to a complete picture. Following the transformation of a block, the transformed coefficients obtained are in part decorrelated. These coefficients are compared with a threshold and the low amplitude coefficients, whose absence does not significantly modify the quality of the picture are eliminated. The coefficients are then classified, coded and transmitted.

Bearing in mind the decorrelation properties of the transformation operation, it is not necessary to excessively increase the size of a block for decorrelating two objects in the picture.

Research has shown that the correlation length in the picture formed from approximately 625 lines and 720 dots per line was approximately 32. It is therefore of interest to use a block size linked with said correlation length.

In known coding systems, a picture is broken down into identical blcks having a fixed size. The currently used block sizes are $8 \times 8$, $16 \times 16$ and sometimes $32 \times 32$ picture elements. The larger the blocks, the better the compression factor, but the compression gain is less on passing from 16 to 32 picture elements than on passing from 8 to 16 picture elements.

This size results from a compromise between the desire to have large size blocks for limiting the number of displacement vectors and therefore the bit rate of the transmission line and the wish to have small size bblocks to make it possible to better distinguish within the picture close small objects with different movements. The size of a block is fixed as a function of these two opposing criteria and is never satisfactory.

The object of the invention is to obviate these disadvantages. The invention relates to a process for coding by transformation making it possible to allocate a displacement vector both to large size moving objects and to small size moving objects, while respecting the authorized bit rate on the transmission line.

According to the invention, the size of the blocks is not fixed and is instead dynamically fixed. More specifically, the picture is broken down into blocks not necessarily having the same size and, if it appears that a block is not fixed, i.e. said block contains at least one moving object, said block is itself broken down into a plurality of subblocks, which are each independently processed, in the same way as the blocks in known coding systems.

More specifically, the present invention relates to a process for coding by transformation for the transmission on a transmission line of a picture signal constituted by a sequence of frames, each containing a picture or image, said process comprising a first stage of breaking down the image or picture into blocks, each block containing a set of matrix-organized digital data representing part of the picture, said process being characterized in that it comprises, for each block of a picture, a stage of detecting movement by comparing said block of the current picture with the corresponding block of the preceding picture, and a second stage which, if no movement is detected in the block, is an emission or transmission on the transmission line of a non-refreshing code of the block and an identification code of the block in the picture and which, if a movement is detected in the block, is a breakdown of the block into several subblocks and, for each subblock, a detection of the movement of said subblock by comparison with the corresponding subblock in the corresponding block of the preceding picture, the information contained in said subblock being coded and transmitted as a function of the result of the movement detection.

The inventive process is not limited to a particular mode of coding moving subblocks and instead can be used no matter what the coding and, in particular, coding by movement estimation or inter-picture coding. The latter is also only a particular case of coding by movement estimation consisting of defining a zero value displacement vector.

In preferred manner, if no movement is detected in the subblock, the process according to the invention consists of transmitting on the transmission line a non-refreshing code of said subblock and an identification code of said subblock in the picture and, if a movement is detected in said subblock, calculating a reduced subblock equal to the difference between said subblock and the corresponding subblock of the preceding picture and transmitting on the transmission line a code which is a function of said reduced subblock.

According to a secondary feature, the code which is a function of the reduced subblock is a code representing said reduced subblock transformed by a space-time, quantified transformation operator.

Advantageously, each moving subblock is broken down into a set of elementary blocks and, for each of said elementary blocks, the movement is analyzed and said elementary block is coded as a function of the result of the movement detection.

In a preferred manner, if no movement is detected in the subblock, the process according to the invention consists of transmitting on the transmission line a non-refreshing code for said subblock and an identification code of said subblock in the picture and, if a movement is detected in said subblock, seeking a displacement vector representing the displacement of said subblock between the preceding picture and the current picture and compensating the movement of said subblock as a function of said displacement vector, a code being transmitted on the transmission line as a function of said compensation.

In preferred manner, if compensation is perfect, i.e. if the subblock is identical to a subblock of the preceding picture, on the transmission line is transmitted a code representing the displacement vector and an identification code of said subblock in the picture.

In preferred manner, if the compensation is not perfect, a reduced subblock is calculated, which is equal to the difference between the said subblock and its estimate, i.e. the subblock of the preceding picture displaced by the value of the displacement vector. Said reduced subblock is coded by a mathematical space-time transformation operation and on the transmission line is transmitted a code representing the digital data contained in said transformed reduced subblock and an identification code of the subblock in the picture.

According to another advantageous variant, each subblock, whose compensation is not perfect, is broken down into several parts, called elementary blocks and each elementary block is compared with a block of the same size of the preceding picture for detecting a movement and each elementary block is coded as a function of whether it is fixed or moving.

According a special feature, each block is of size $N \times M$, in which N and M are even integers and each subblock is of size $N/2 \times M$, $N \times M/2$ or $N/2 \times M/2$.

According to a secondary feature, when several subblocks of the same block are moving, the breaking down of the block into subblocks is repeated to define a moving subblock containing the preceding moving subblocks and for optionally defining one or more fixed subblocks.

In preferred manner, the transformation operator applied to the block or subblock, whose compensation is not perfect is a discreet cosine transform.

The features nd advantages of the invention can be better gathered from the following non-limitative, illustrative description and with reference to the attached drawings, wherein show:

FIG. 1—Diagrammatically a system of coding by transformation for performing the inventive process.

FIGS. 2a to 2d—The breaking down of a picture into a plurality of subblocks.

Figure 3:
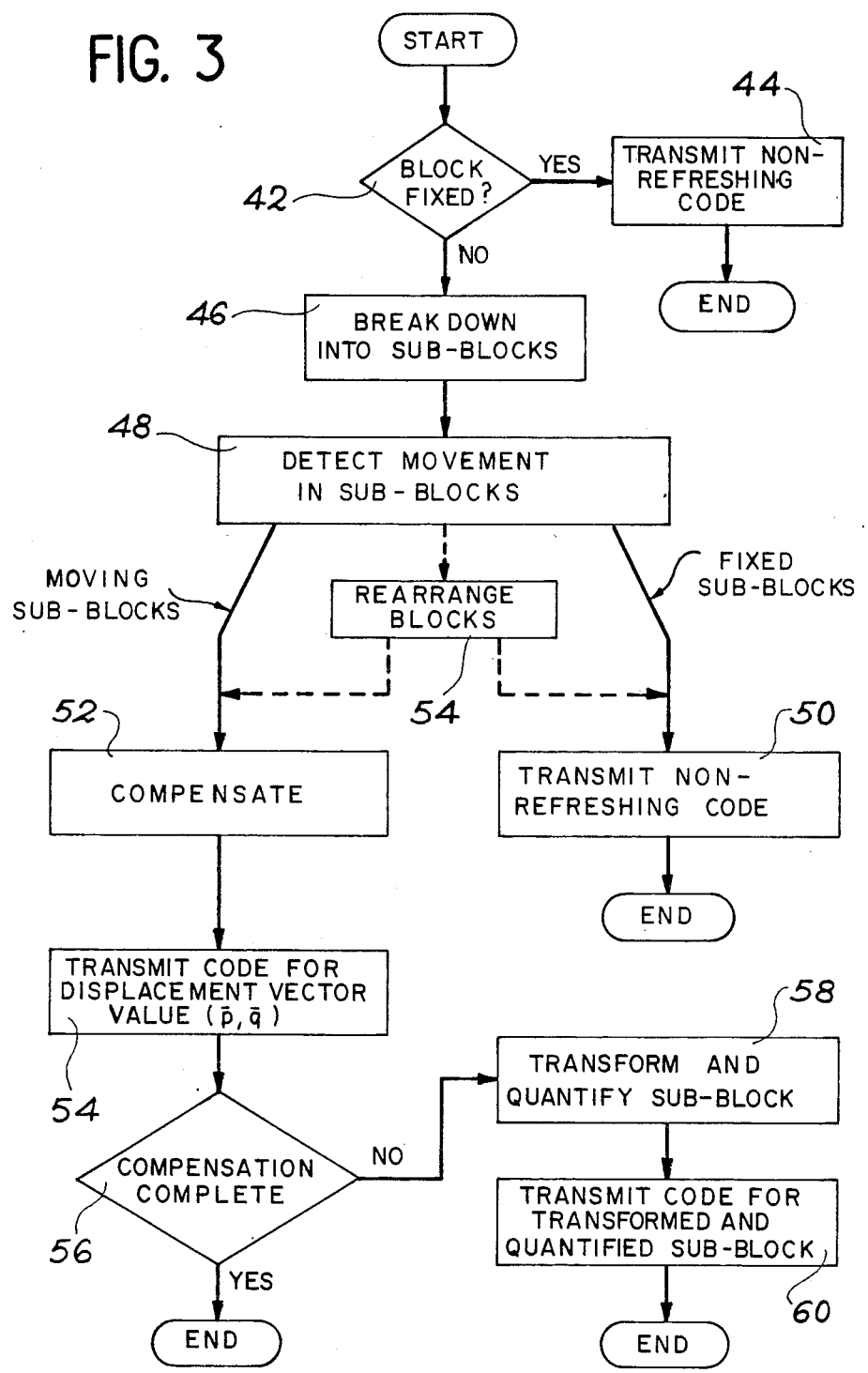

FIG. 3—A flow chart of the inventive process in the case where a block of a picture is broken down into four identical subblocks.

FIGS. 4 to 8—Different possible cases of moving subblocks and fixed subblocks in a block broken down into four identical blocks.

Figure 9:
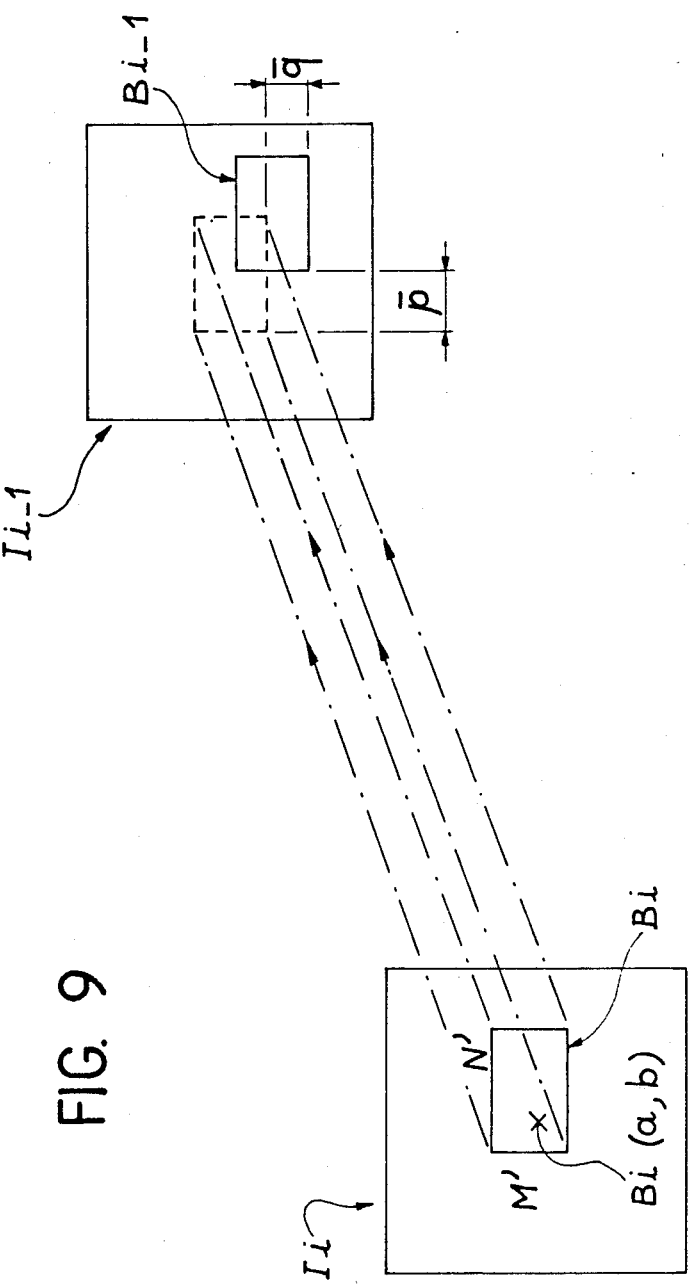

FIG. 9—Seeking the displacement vector for a moving subblock.

Figure 10:
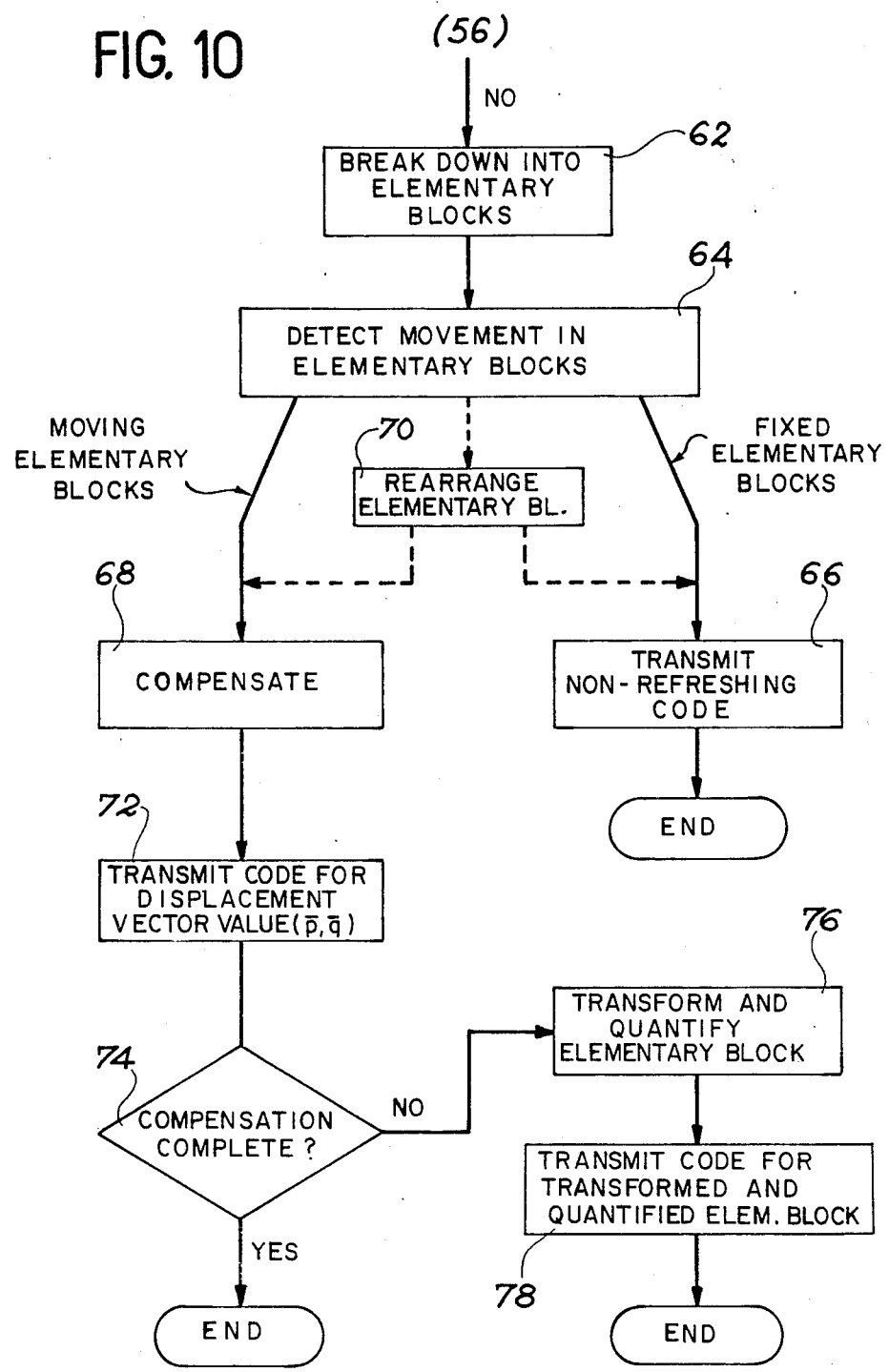

FIG. 10—A variant of the flow chart of FIG. 3 comprising breaking down a subblock into elementary blocks, when the compensation of said subblock is not perfect.

FIG. 1 shows a circuit for coding by transformation for performing the inventive process and which in exemplified form is a movement estimation coding circuit.

It comprises a subtracter 2 receiving on one input a block of the current picture and on the other input a block of the preceding picture transmitted to the decoder, said picture being stored in a memory 4. The output of subtracter 2 is connected to the input of a movement detector 6 having three outputs, namely a first output for supplying a fixed block signal $S_{BF}$ when the two blocks received at the subtracter input are identical or a fixed subblock when the two blocks are not identical, but the two subblocks are identical, a second output for supplying a signal $S_{SB}$ indicating a breaking down into subblocks when the blocks received at the subtracter input are not identical and a third input for supplying a signal representing an uncompensated moving subblock. The third output of movement detector 6 is connected to the input of a transformation means 8, whose output is connected to the input of a quantifier 10.

The circuit also comprises a compensating means 12 receiving on one input the picture block to be coded and whereof another input is connected to the output of the memory 4 containing the preceding picture. Movement compensation is applied to the block of the current picture or to subblocks of said block in accordance with signal $S_{SB}$ supplied by movement detector 6. Compensating means 12 supplies a signal $S_{VD}$ representing the displacement vector for compensating said block or subblocks of the current picture.

This signal is received on one input of a multiplexer 14, which receives on a second input the signal $S_{BF}$ supplied by movement detector 6 and on a third input the signal supplied by quantifier 10. The output of multiplexer 14 is connected to the transmission line.

Memory 4 contains the preceding picture as received by the decoder located at the other end of the transmission line. For the storage of said picture, the circuit comprises a reverse quantifier 16, whose input is connected to the output of quantifier 10, a reverse transformation means 18, whose input is connected to the output of reverse quantifier 16 and an adder 20, whereof one input is connected to the output of the reverse transformation means 18 and whose other input is connected to the output of memory 4, the output of adder 20 being connected to the input of memory 4.

The circuit shown in FIG. 1 has a conventional structure, except with respect to the detection means 6 which, here, does not only detect the movement on a picture block, but also on the subblocks of said block. It then supplies to compensating means 12, a signal $S_{SB}$ indicating the breaking down of the block into several subblocks, as well as the form and position of the latter.

In accordance with the invention, a description will now be given of the operation of the coding circuit of FIG. 1.

The process according to the invention comprises two main stages which are, on the one hand, a stage of detecting movement of a block of the current picture, by comparing said block with the corresponding block, i.e. occupying the same position in the picture with respect to the preceding picture, and on the other hand, if a movement is detected in the block, a second stage of breaking down the block into a plurality of subblocks on each of which a movement detection is performed.

The breaking down of a block into several subblocks can be done in a random way and the subblocks are not necessarily identical. In exemplified manner, FIG. 2a shows the breaking down of a moving block 22 into a plurality of subblocks 24 to 34.

A movement analysis of each of the subblocks is performed by the movement detection means 6. For example, it is assumed that subblocks 28 and 30 are moving, said subblocks being shown in FIG. 2b by a hatched area.

For each of the fixed subblocks 24, 26, 32, 34, an identification code for the subblock indicating its size and its position in the block or picture is transmitted on the transmission line with a non-refreshing code for said subblock.

For each of the moving subblocks 28, 30, a signal representing the movement of said subblock is transmitted. In the case of the circuit of FIG. 1, each subblock is compensated by seeking a subblock of the same size in the preceding picture and by transmitting the displacement vector between said subblock and the identical subblock of the preceding picture.

If the compensation is not perfect, the difference between the subblock and the estimate of the said subblock deduced from the preceding picture is coded by transformation and quantification.

Other moving subblock coding methods are known. For example, it is possible to transmit a signal representing the difference between the moving subblock and the corresponding subblock, i.e. occupying the same position in the picture, of the preceding picture (inter-picture coding).

In the case of FIG. 2b, each subblock is separately processed. It may be of interest in certain cases to regroup the moving subblocks or at least some of them, so as to reduce the number of moving subblocks to be transmitted.

For example, as shown in FIG. 2c, it is possible to define a new subblock 36 including moving subblocks 28, 30. Said subblock 36 also contains a part of the fixed subblock 24. It is also possible to regroup the remaining fixed subblocks. In FIG. 2c, these subblocks have been regrouped into two subblocks 38, 40. The rearrangement of block 22 into three subblocks 36, 38, 40, whereof only one subblock is moving, in certain cases, makes it possible to reduce the bit rate for the coding of said block.

According to another variant of the inventive process, the moving subblocks 28, 30 shown in FIG. 2b can, when they are coded by movement compensation and the compensation is not perfect, be themselves broken down into several parts, called elementary blocks.

For example, in FIG. 2d, subblock 28 has been broken down into three elementary blocks 28a, 28b, 28c, the latter being moving. In the same way, subblock 30 has been broken down into five elementary blocks 30a–30e, whose elementary blocks 30c and 30e are moving.

Such a breaking down permits a better discernment of the moving parts of block 22. However, it can lead to an excessive subdivision of block 22, which leads to an increase in the number of bits necessary for its transmission. This shortcoming can be reduced by regrouping the moving elementary blocks, as in the case of FIG. 2c.

A description will now be given in greater detail of the inventive process with respect to the flow chart of FIG. 3. This process is applied separately to each block of a received picture broken down into blocks.

The first stage of the process is a test 42 for detecting movement in the block. In the circuit of FIG. 1, this conventional stage is performed by subtracter 2, which receives on one input the block and on another input the corresponding block of the preceding picture and the movement detector 6, which analyzes the difference in the blocks applied by subtracter 2.

If the two blocks are identical, the block of the current picture is fixed and by an operation 44 is transmitted on the transmission line a non-refreshing code for the block and a code for the identification of said block in the picture.

However, if the block is moving, according to the invention, said block is broken down in an operation 46 into a plurality of subblocks. As was stated with respect to FIGS. 2a to 2d, any breakdown is possible. In particular, the subblocks are not necessarily identical.

However, it may be advantageous to break down a block of size N×M, in which N and M are even integers, into four identical subblocks of size N/2×m/2. This makes it possible for certain transformation operations performed by transformation 8 (FIG. 1) to use the same transformation operator for the complete block and for a subblock or a group of two subblocks. We will return to this property of transformations later in the description.

The operation 46 of breaking down into subblocks performed by detection means 6 (FIG. 1) is followed by an operation 48 for detecting movement in the subblocks. It is carried out in the same way as the movement detection in the block.

The subblocks are then distributed into two groups, a group of moving subblocks and a group of fixed subblocks. For the latter, the procedure is the same as for a fixed block, i.e. a non-refreshing code for said subblock is transmitted, together with a code for identifying the subblock in the picture (operation 50). For the moving subblocks, processing continues by a compensation operation 52, which is carried out by the compensating means 12 of the circuit of FIG. 1.

FIGS. 4 to 8 show the different possible cases of moving subblocks in a moving block, in which the block is broken down into four identical subblocks.

Figure 8:

FIGS. 4a to 4d illustrate the four possibilities corresponding to a single moving subblock. In the same way, FIGS. 5a to 5d illustrate the four possibilities of having two contiguous moving subblocks and FIGS. 6a to 6b the two possibilities of having two moving subblocks disposed on the same diagonal. FIGS. 7a to 7d show the four possibilities of having three moving subblocks and FIG. 8 shows the case where the four subblocks are moving.

According to the invention, it is possible to compensate each moving subblock separately. As shown in FIG. 2c, it is also possible to regroup several moving subblocks in order to define a new moving subblock. This optional operation 58 is performed after operation 48 and before operation 50 and 52.

For example, it is possible to regroup into a single moving subblock, the two moving subblocks in FIGS. 5a to 5d and, in the same way, to regroup into a single fixed subblock, the two fixed subblocks therein. It is also possible to regroup the moving subblocks in FIGS. 6a to 7d. The new moving subblock is then equal to the complete subblock, as shown in FIG. 8.

Following this regrouping, it is possible to classify the moving blocks in three categories A, B, and C, respectively corresponding to blocks in which the new moving subblock has a size of a single subblock, two subblocks and four subblocks. These categories are given above the blocks in FIGS. 4 to 8.

Compensation operation 52 is known and consists of measuring the displacement of the subblock between the preceding picture and the current picture.

FIG. 9 shows a subblock $B_i$ of size $N' \times M'$, in which $N'$ is equal to N or N/2 and M' is equal to M or M/2, of the current picture $I_i$. In the preceding picture $I_{i-1}$, said block $B_{i-1}$ occupies a different position. The compensation consists of evaluating the coordinates $\bar{p}$ and $\bar{q}$ of the displacement vector of said subblock between the two pictures. More specifically, it is a question of calculating the term $Y_{n,m}(p,q)$ equal to $$f[I_i(a+n,b+m) - I_{i-1}(a+n+p,b+m+q)]$$

in which $I_i(x,y)$ is the value of the picture element of coordinates (x,y) in the picture $I_i$, f(u-v) is a mesurement of the variation of the amplitudes between two different points of two successive pictures $I_i$ and $I_{i-1}$, a and b are the coordinates of the corner picture element of block $B_i$ and p and q are the coordinates of the displacement vector.

For example, it is possible to choose for the function f, the standard error function defined by $f(u-v) = (u-v)^2$ or the absolute value function defined by $f(u-v) = |u-v|$.

The compensation consists of finding the values $\bar{p}$ and $\bar{q}$ of the coordinates p, q of the displacement vector so as to minimize:

$$\sum_{n=0}^{N-1} \sum_{m=0}^{M-1} U_{n,m}(p,q)$$

According to the result, a block of category C can become a perfectly compensated block, a block of category A, a block of category B or can remain a block of category C. In the same way a block of category B can be perfectly compensated, or give a block of category A, or remain a block of category B. Finally, a block of category A can be perfectly compensated, or remain a block of category A.

As seen from FIG. 3, for each compensated subblock, there is a transmission operation 54 on the transmission line of a code representing the value of the displacement vector and a subblock identification code.

By a test 56, there is then a determination as to whether the subblock is perfectly compensated. If this is not the case, there is an operation 58 of coding by transformation and quantification of the reduced subblock equal to the difference between the subblock and its estimate (subblock of the preceding picture displaced by the value of the displacement vector).

Transformation is carried out by the transformation means 8 of the circuit of FIG. 1. The most widely used transforms are the discrete cosine transform, the highly correlated discrete transform, the HADAMARD transform or the HAAR transform.

These transforms have the property that the N/2 even value coefficients (the coefficients are allocated with a value by the sequence of N integers between 0 and N−1) supplied by a transformation operator of dimension N constitute the transform of dimension N/2, when the operator receives a sequence of length N formed by N/2 non-zero values followed by N/2 zero values or vice versa. These properties are described, in the case of the discreet cosine transform, in French patent application No. 8507717, filed on May 22 1985 by J. Guichard and Eric Cassimalis entitled "Circuit for the fast calculation of the discreet cosine transform". This property is true for the cosine transform for any even value of N and for the other transforms for the values of N, such as $N = 2^n$, in which N is an integer. It is therefore possible to use a single transformation operator $N \times M$ for calculating the transform of a block of size $N \times M$, but also of subblocks of size $N/2 \times m$, $N \times M/2$ and $N/2 \times M/2$.

Thus, when considering a transformation operator T of size $N \times M$, said operator, when applied to a block if size $N \times M$, produces a transformed block F of size $N \times M$. For a block of size $N \times M$, such as that of FIG. 5a, where the two upper subblocks are moving and the two lower subblocks are fixed (the coefficients of said subblocks being zero), the transformed subblock G corresponding to the transformation of two moving subblocks is deduced from the transformed block F of the complete block in the following way:

$$G_{ij} = F_{2ij}$$

in which $0 \leq i \leq (N/2)-1$ and $0 \leq j \leq M-1$.

In the same way, the transformed subblock H of the moving subblock of FIG. 4a is defined by the following:

$$H_{ij} = F_{2i,2j}$$

in which $0 \leq i \leq (N/2)-1$ and $0 \leq j \leq (M/2)-1$.

Thus, in the same way for the moving subblock of FIG. 4b, we obtain $H_{ij} = F_{2i,2j}$.

Figure 4:
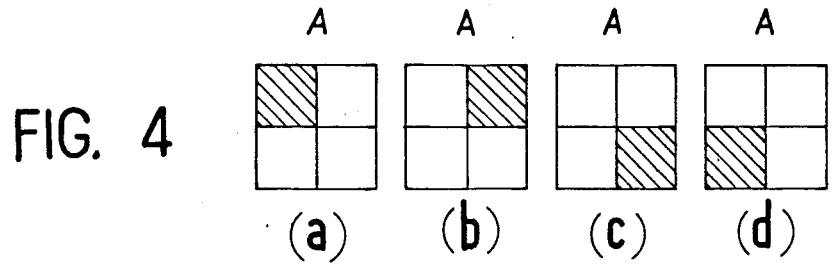
Figure 5:
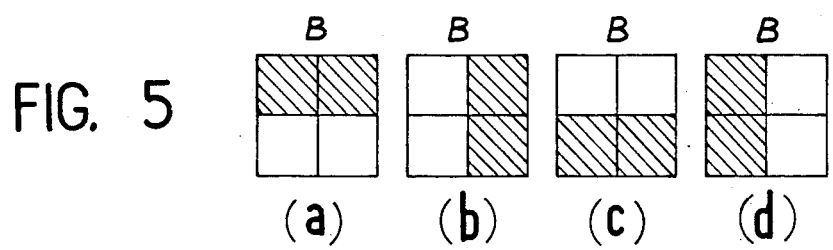
Figure 6:
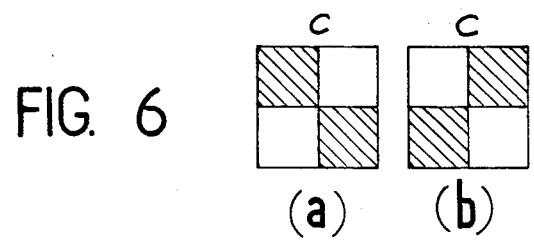
Figure 7:
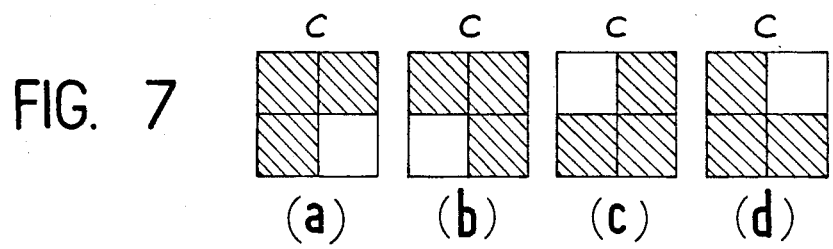

Another way of calculating the transform of the moving subblocks in the blocks of FIGS. 4 and 5 consists of symmetrizing these blocks by replacing the fixed subblocks by the moving subblock or subblocks.

For example, in the block of FIG. 5a of form $B = |B_{ij}|$, in which $0 \leq i \leq N-1$ and $0 \leq j \leq M-1$, in which $B_{i,j} = 0$ for $i > (N/2)-1$, the symmetrization consists of defining the value of the coefficients of the fixed subblocks by $B_{i,j} = B_{N-1-i,j}$ for $i > (N/2)-1$.

Transform K of size $N/2 \times M$ of the moving subblock is deduced from the transform J of size $N \times M$ of the symmetrized block by the following:

$$K_{i,j} = \tfrac{1}{2} J_{2i,j}$$

in which $0 \leq i \leq (N/2)-1$ and $0 \leq j \leq M-1$.

On returning to FIG. 3, for the moving subblocks not perfectly compensated, a reduced subblock is calculated, which is equal to the difference between said subblock and its estimate and, by an operation 58, said reduced subblock is transformed and quantified. The following stage is an operation 60 of coding said quantified transformed reduced subblocks. This stage is conventionally performed by Read-Solomon coding on the sequence of quantified transformed coefficients.

In the process of the invention described with reference to FIG. 3, the reduced subblocks iof the incompletely compensated subblocks are transmitted in coded form after being transformed and quantified.

This processing can be replaced by another processing, in which each compensated subblock is itself broken down into several elementary blocks, each elementary block then being processed in the same way as the subblock.

FIG. 10 is a flow chart illustrating this variant of the inventive process. Processing successively comprises an operation 62 of breaking an uncompensated subblock down into elementary blocks, an operation 64 of analyzing the movement in the elementary blocks, an operation 66 of transmitting a non-refreshing code for the fixed elementary blocks and an operation 68 for carrying out compensation on the moving elementary blocks.

These operations 62, 64, 66 and 68 are respectively similar to the operations 46, 48, 50 and 52 relative to the processing of subblocks.

According to a variant, the operation 64 of detecting movement in the elementary blocks can be followed by an operation 70 of rearranging elementary blocks, identical to the operation 54 of the flow chart of FIG. 3.

For each compensated elementary block, the compensation operation 68 is followed by an operation 72, in which a code representing the displacement vector of said elementary block and a code for identifying the latter is transmitted. Then, for each elementary block, a test 72 is carried out for determining whether the compensation is perfect. If this is not the case, the reduced elementary block equal to the difference between the elementary block and its estimate, i.e. the elementary block of the preceding picture displaced by the value of the displacement vector, is transformed and then quantified during an operation 76. Finally, a code representing said quantified elementary block is transmitted (operation 78).

Stages 72, 74, 76 and 78 applied to the elementary blocks are respectively identical to stages 54, 56, 58 and 60 applied to the subblocks.

According to a simplified variant, stage 64 or stage 70, as applicable, is solely followed by stages 76 and 78.

We claim:

1. A process for coding by transformation for the transmission on a transmission line of a picture signal constituted by a sequence of frames, each containing a picture, said process comprising a stage of breaking the picture down into blocks, each block containing a group of matrix-organized digital data and representing part of the picture, the process being characterized in that it comprises, for each block, the steps of detecting movement of the block by comparing the said block of the current picture with the corresponding block of the preceding picture, if no movement is detected in the block, transmitting on the transmission line a non-refreshing code for the block and an identification code for the block in the picture and if a movement is detected in the block, breaking down the block into several subblocks, detecting movement in each subblock of the block by comparing with the corresponding subblock of the corresponding block of the preceding picture and transmitting on the transmission line a code which is a function of the movement of the subblock.

2. A process according to claim 1, characterized in that each moving subblock is broken down into a group of elementary blocks and for each of said elementary blocks the movement is analyzed and said elementary block is coded as a function of the result of the movement detection.

3. A process according to claim 1, characterized in that, for each subblock if no movement is detected therein, on the transmissiion line is transmitted a non-refreshing code of said subblock and an identification code of said subblock in the picture and, if a movement is detected in the said subblock, a reduced subblock is detected, which is equal to the difference between said subblock and the corresponding subblock of the preceding picture and on the transmission line is transmitted a code which is a function of said reduced subblock.

4. A process according to claim 3, characterized in that said code which is a function of said reduced subblock is a code representative thereof and transformed by a space-time transformation operator and quantified.

5. A process according to claim 1, characterized in that, for each subblock, if no movement is detected in the subblock, a non-refreshing code of said subblock and an identification code of said subblock in the picture is transmitted and if a movement is detected in the subblock the displacement vector of said subblock between the preceding picture and the current picture is sought, the movement of said subblock is compensated as a function of said displacement vector and on the transmission line is transmitted a code which is a function of the compensation.

6. A process according to claim 5, characterized in that for each compensated subblock, whose compensation is perfect, on the transmission line is transmitted a code representing the displacement vector and an identification code of said subblock in the picture.

7. A process according to claim 5, characterized in that, for each compensated subblock, whose compensation is not perfect, a calculation takes place of a reduced subblock equal to the difference between the subblock and its estimate, said reduced subblock is coded by a space-time transformation operator and on the transmission line is transmitted a code representing the data contained in the quantified, transformed, reduced subblock and an identification code of said subblock in the picture.

8. A process according to claim 1, characterized in that, for each compensated subblock, whose compensation is not perfect, said subblock is broken down into elementary blocks, the movement of each elementary block is detected and for each elementary block is transmitted on the transmission line a code which is a function of the movement of said elementary block.

* * * * *